(12) United States Patent
Miao et al.

(10) Patent No.: US 12,420,343 B2
(45) Date of Patent: Sep. 23, 2025

(54) HORIZONTAL COMPUTER NUMERICAL CONTROL (CNC) MACHINING DEVICE FOR CRANKSHAFT

(71) Applicants: NINGBO C.S.I. POWER & MACHINERY GROUP CO., LTD., Ningbo (CN); NINGBO C.S.I. POWER CO., LTD., Ningbo (CN)

(72) Inventors: Lianxin Miao, Ningbo (CN); Jie Wu, Ningbo (CN); Lei Wang, Ningbo (CN); Feng Zhou, Ningbo (CN); Yidong Yang, Ningbo (CN)

(73) Assignees: NINGBO C.S.I. POWER & MACHINERY GROUP CO., LTD., Ningbo (CN); NINGBO C.S.I. POWER CO., LTD., Ningbo (CN)

( * ) Notice: Subject to any disclaimer, the term of this patent is extended or adjusted under 35 U.S.C. 154(b) by 347 days.

(21) Appl. No.: 18/018,881

(22) PCT Filed: Sep. 8, 2020

(86) PCT No.: PCT/CN2020/113971
§ 371 (c)(1),
(2) Date: Jan. 31, 2023

(87) PCT Pub. No.: WO2022/051894
PCT Pub. Date: Mar. 7, 2022

(65) Prior Publication Data
US 2023/0302552 A1  Sep. 28, 2023

(51) Int. Cl.
*B23C 3/06* (2006.01)
(52) U.S. Cl.
CPC .................................... *B23C 3/06* (2013.01)

(58) Field of Classification Search
CPC ... B23C 3/06; B23C 2215/20; B23C 2220/64; Y10T 29/17; Y10T 29/49286; Y10T 409/30756; Y10T 409/307616
(Continued)

(56) References Cited

U.S. PATENT DOCUMENTS 4,388,027 A * 6/1983 Blaimschein ............ B23Q 1/76
409/199
4,790,698 A * 12/1988 Heffron ................ B23D 37/005
409/199
(Continued)

FOREIGN PATENT DOCUMENTS

| CN | 101513720 A | 8/2009 |
|---|---|---|
| CN | 101961835 A | 2/2011 |

(Continued)

OTHER PUBLICATIONS

English Machine Translation of CN102806467 (Year: 2012).*

*Primary Examiner* — Sarang Afzali
*Assistant Examiner* — Darrell C Ford
(74) *Attorney, Agent, or Firm* — Fideli Law PLLC; Qiang Li

(57) ABSTRACT

A horizontal computer numerical control (CNC) machining device for a crankshaft includes a horizontal machining workbench provided thereon with the crankshaft and a milling spindle adjusting device provided on a side of the horizontal machining workbench along a length direction of the crankshaft. A milling spindle is fixedly provided on the milling spindle adjusting device, and the milling spindle adjusting device includes an X-axis adjusting mechanism, a Y-axis adjusting mechanism, and a Z-axis adjusting mechanism, which are configured to adjust the spatial position of the milling spindle relative to the crankshaft. The horizontal machining workbench is provided thereon with a C-axis headstock configured to drive the crankshaft to rotate. The (Continued)

horizontal CNC machining device can mill on an outside diameter of a crankshaft or a diameter of an eccentric shaft, and can mill, drill, bore, or tap an outer surface of a workpiece through X, Y, and Z-axis feeding movement.

5 Claims, 6 Drawing Sheets

(58) Field of Classification Search
USPC .............................. 29/888.08, 6.01; 409/199
See application file for complete search history.

(56) References Cited

U.S. PATENT DOCUMENTS

| | | | |
|---|---|---|---|
| 5,189,785 A * | 3/1993 | Toyota Jidosha Kabushiki Kaisha .................. | B23P 19/042 29/898.07 |
| 6,026,549 A * | 2/2000 | Makino ..................... | B24B 5/42 451/399 |
| 2010/0003098 A1 | 1/2010 | Faigle et al. | |

FOREIGN PATENT DOCUMENTS

| | | |
|---|---|---|
| CN | 102806467 A | 12/2012 |
| CN | 103737029 A | 4/2014 |
| CN | 204036110 U | 12/2014 |
| CN | 109475991 A | 3/2019 |

* cited by examiner

HORIZONTAL COMPUTER NUMERICAL CONTROL (CNC) MACHINING DEVICE FOR CRANKSHAFT

CROSS REFERENCE TO THE RELATED APPLICATIONS

This application is the national phase entry of International Application No. PCT/CN2020/113971, filed on Sep. 8, 2020, the entire contents of which are incorporated herein by reference.

TECHNICAL FIELD

The present invention relates to the technical field of crankshaft machining devices and, in particular, to a horizontal computer numerical control (CNC) machining device for a crankshaft.

BACKGROUND

In a general piston engine, as a key component for transferring kinetic energy, the crankshaft is provided to convert the reciprocating motion of the piston into rotational motion to output the power of the engine. Heavy-duty crankshafts with complex shapes require high machining accuracy to ensure their ability to withstand torque, bending moment, and dynamic load. There is a great demand for heavy-duty crankshafts, so they must be produced in large quantities. However, for professional crankshaft manufacturers, the prior horizontal machining devices are manually operated with high labor intensity, low machining efficiency, and poor versatility and must adopt dedicated eccentric fixtures for turning. In addition, the machine tool is unable to achieve continuous cutting of the side of the crankshaft journal, resulting in many empty feeds, and each type of crankshaft requires a corresponding dedicated fixture. This greatly increases the input cost of equipment and human resources, and it is still hard to effectively ensure the dimensional accuracy of the crankshaft.

SUMMARY

An objective of the present invention is to provide a horizontal CNC machining device for a crankshaft. The present invention can mill on an outside diameter of a crankshaft or a diameter of an eccentric shaft and can mill, drill, bore, or tap an outer surface of a workpiece through X, Y, and Z-axis feeding movement.

To achieve the above objective, the present application provides the following technical solution. The horizontal CNC machining device for a crankshaft includes a horizontal machining workbench provided thereon with the crankshaft and a milling spindle adjusting device provided on a side of the horizontal machining workbench along the length direction of the crankshaft. The milling spindle adjusting device is fixedly provided thereon with a milling spindle, and the milling spindle adjusting device includes an X-axis adjusting mechanism, a Y-axis adjusting mechanism, and a Z-axis adjusting mechanism. The X-axis adjusting mechanism, the Y-axis adjusting mechanism, and the Z-axis adjusting mechanism are perpendicular to each other and are configured to adjust the positions of the milling spindle relative to the crankshaft along an X-axis, a Y-axis, and a Z-axis, respectively. The horizontal machining workbench is provided thereon with a C-axis headstock configured to drive the crankshaft to rotate. The C-axis headstock is provided with a position locking mechanism. The position locking mechanism is configured to lock a peripheral position of the crankshaft relative to the milling spindle and includes an encoder assembly configured to feed back a detection signal and a brake assembly configured to lock the crankshaft. The C-axis headstock is provided therein with a controller configured to control the brake assembly to perform a corresponding action according to the detection signal fed back by the encoder assembly.

Preferably, the X-axis adjusting mechanism includes an X-axis moving base provided along the length direction of the crankshaft. The Y-axis adjusting mechanism includes a first pillar slidably connected to the X-axis moving base, and a Y-axis moving slide plate is slidably connected to the first pillar. The Z-axis adjusting mechanism includes a Z-axis ram slidably connected to the Y-axis moving slide plate. The milling spindle is provided on the Z-axis ram.

Preferably, the X-axis adjusting mechanism includes a first servo motor provided on a side of the X-axis moving base. The X-axis moving base is provided thereon with a first screw rod connected to an output end of the first servo motor. The bottom of the first pillar is provided with a first internal thread sleeve mated with the first screw rod. The first internal thread sleeve is sleeved outside the first screw rod. The Y-axis adjusting mechanism includes a second servo motor provided on the top of the first pillar, and the second servo motor has an output end connected to a second screw rod. The Y-axis moving slide plate is provided with a second internal thread sleeve, and the second internal thread sleeve is sleeved outside the second screw rod. The Z-axis adjusting mechanism includes a third servo motor fixedly provided on the Y-axis moving slide plate, and the third servo motor has an output end connected to a third screw rod. The Z-axis ram is provided with a third internal thread sleeve, and the third internal thread sleeve is sleeved outside the third screw rod. The Z-axis adjusting mechanism further includes a fourth motor provided at a side of the Z-axis ram away from the milling spindle.

Preferably, the horizontal machining workbench further includes a tailstock, and the tailstock is provided at a side of the crankshaft away from the C-axis headstock to define a central position of the crankshaft. The tailstock is provided with a center rotatably connected to the crankshaft.

Preferably, the horizontal machining workbench includes a workbench body. The workbench body is provided thereon with a first slide rail at a side of the tailstock. The tailstock is slidably connected to the first slide rail through a tailstock base. The tailstock base is provided thereon with a first locking element configured to fix the tailstock to the first slide rail.

Preferably, the horizontal machining workbench further includes a central carrier provided on the workbench body and configured to support a journal of the crankshaft.

Preferably, the central carrier is slidably connected to the workbench body, and the bottom of the central carrier is provided with a second locking element configured to fix the central carrier to the workbench body.

Preferably, the C-axis headstock further includes a drive shaft connected to the crankshaft and a drive assembly configured to control the speed of the drive shaft.

Preferably, the drive assembly includes a fifth servo motor, and the fifth servo motor is connected to a headstock timing pulley through a conveyor belt. The headstock timing pulley is connected to the drive shaft through a transmission shaft. The transmission shaft is connected to a transmission case.

Preferably, the encoder assembly includes an encoder connected to the drive shaft through an encoder timing pulley, and the encoder has an output end electrically connected to the controller. The brake assembly includes a brake pad fixedly provided on the drive shaft. The C-axis headstock is provided with a brake caliper mated with the brake pad to lock the brake pad, and an output end of the controller is connected to the brake caliper.

Compared with the prior art, the present invention has the following beneficial effects:

In the present invention, the milling spindle adjusting device adjusts the spatial position of the milling spindle relative to the crankshaft, such that machining is performed at different positions of the crankshaft. The position locking mechanism is provided to facilitate the machining of the crankshaft at a specified angle. The position locking mechanism includes the encoder assembly configured to control a locking angle, and the encoder assembly is mated with the controller to control the locking angle. The brake assembly locks the crankshaft at the specified angle. There are two machining modes, which improve machining efficiency.

The tailstock and the central carrier reliably support and position the crankshaft. Through the first locking element and the second locking element, the central carrier and the tailstock can be axially moved and fastened on the workbench body according to the workpiece, which improves the versatility of the machining device.

The C-axis headstock is provided with the drive assembly to control the speed of the drive shaft, thus improving machining accuracy.

Figure 1:
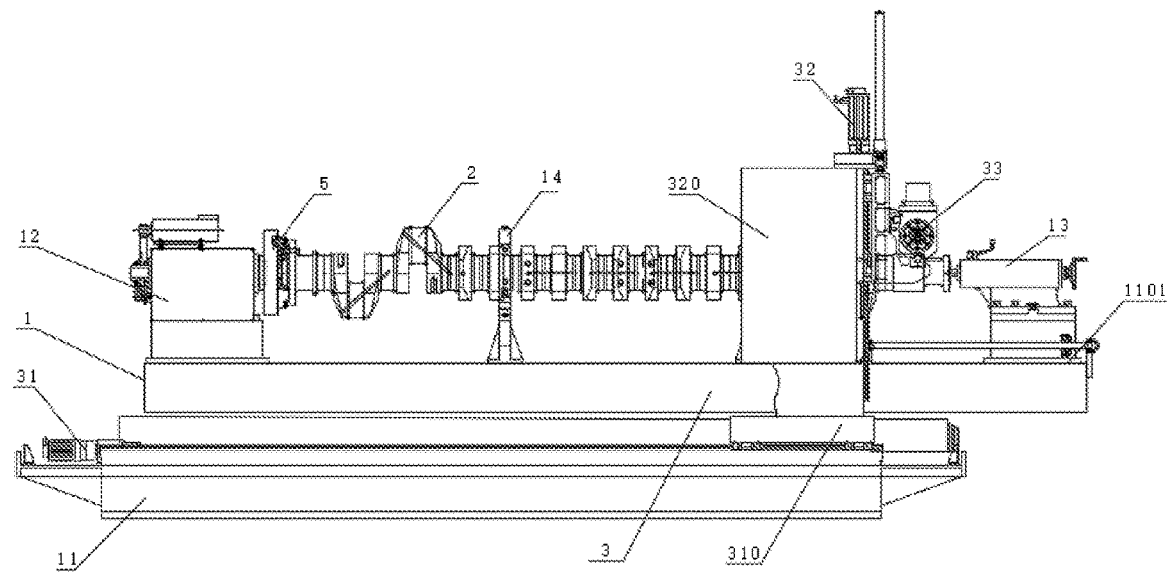
FIG. 1 is a connection diagram of a horizontal CNC machining device for a crankshaft according to the present invention.

Reference Numerals: 1. horizontal machining workbench; 11. workbench body; 1101. first slide rail; 12. C-axis headstock; 120. encoder assembly; 1201. encoder timing pulley; 1202. encoder; 130. brake assembly; 1301. brake pad; 1302. brake caliper; 1303. jaw; 140. drive assembly; 1401. fifth servo motor; 1402. conveyor belt; 1403. headstock timing pulley; 1404. transmission shaft; 13. tailstock; 1301. center; 1302. tailstock base; 1303. first locking element; 14. central carrier; 1401. second locking element; 2. crankshaft; 3. milling spindle adjusting device; 31. X-axis adjusting mechanism; 310. X-axis moving base; 311. first servo motor; 312. first screw rod; 313. first internal thread sleeve; 32. Y-axis adjusting mechanism; 320 first pillar; 321. Y-axis moving slide plate; 3211. vertical part; 3212. bending part; 3213. first slide groove; 3214. second slide groove; 3215. first slider; 3216. second slider; 322. second servo motor; 323. second screw rod; 324. second internal thread sleeve; 33. Z-axis adjusting mechanism; 330. Z-axis ram; 331. milling spindle; 332. third servo motor; 333. third screw rod; 334. third internal thread sleeve; 4. drive shaft; 401. key; 5. flange; and 6. fourth motor.

DETAILED DESCRIPTION OF THE EMBODIMENTS

The technical solutions of the embodiments of the present invention are clearly and completely described below by referring to the drawings. The described embodiments are merely a part, rather than all, of the embodiments of the present invention. All other embodiments obtained by those of ordinary skill in the art based on the embodiments of the present invention without creative efforts should fall within the protection scope of the present invention.

As shown in FIG. 1, a first embodiment of the present invention provides a horizontal CNC machining device for crankshaft 2 that includes horizontal machining workbench 1. The horizontal machining workbench 1 is provided thereon with the crankshaft 2. The horizontal CNC machining device further includes milling spindle adjusting device 3 provided on a side of the horizontal machining workbench 1 along a length direction of the crankshaft 2. The milling spindle adjusting device 3 is fixedly provided thereon with milling spindle 331. The milling spindle adjusting device 3 includes X-axis adjusting mechanism 31, Y-axis adjusting mechanism 32, and Z-axis adjusting mechanism 33 and configured to adjust the spatial position of the milling spindle 331 relative to the crankshaft 2. The horizontal machining workbench 1 is provided thereon with C-axis headstock 12 configured to drive the crankshaft 2 to rotate. The milling spindle adjusting device 3 adjusts the three-dimensional position of the milling spindle 331 relative to the crankshaft 2, such that machining is performed at different positions of the crankshaft 2. The C-axis headstock 12 drives the workpiece to rotate to realize rotational feeding movement. The milling spindle 331 is provided with a milling cutter and configured to perform the cutting movement to realize outside diameter milling, eccentric shaft diameter milling, and opening milling of a shaft part.

Figure 2:
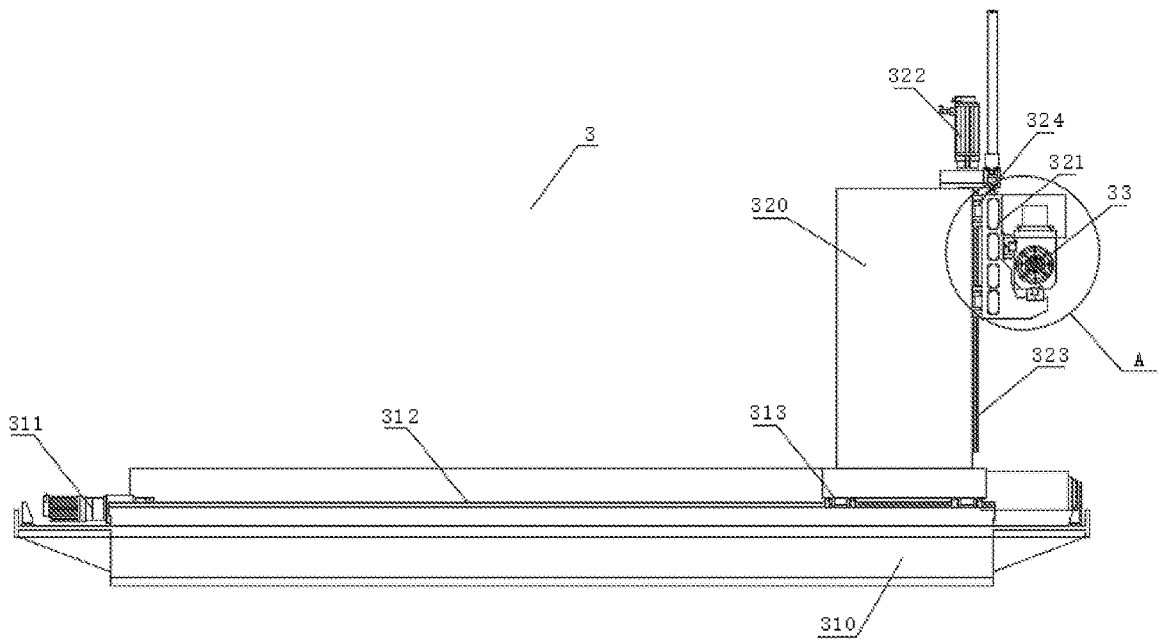
FIG. 2 is a front view of a milling spindle adjusting device of the horizontal CNC machining device for a crankshaft according to the present invention.

As shown in FIG. 2, the X-axis adjusting mechanism 31 includes X-axis moving base 310 provided along the length direction of the crankshaft 2. The Y-axis adjusting mechanism 32 includes first pillar 320 slidably connected to the X-axis moving base 310. The first pillar 320 is slidably connected to Y-axis moving slide plate 321. The Z-axis adjusting mechanism 33 includes Z-axis ram 330 slidably connected to the Y-axis moving slide plate 321. The milling spindle 331 is provided on the Z-axis ram 330. The X-axis adjusting mechanism 31 includes first servo motor 311 provided on a side of the X-axis moving base 310. The X-axis moving base 310 is provided with first screw rod 312. The first screw rod 312 is connected to an output end of the first servo motor 311. The bottom of the first pillar 320 is provided with first internal thread sleeve 313 mated with the first screw rod 312, and the first internal thread sleeve 313 is sleeved outside the first screw rod 312. The Y-axis adjusting mechanism 32 includes second servo motor 322 provided on the top of the first pillar 320. An output end of the second servo motor 322 is connected to second screw rod 323.

Figure 3:
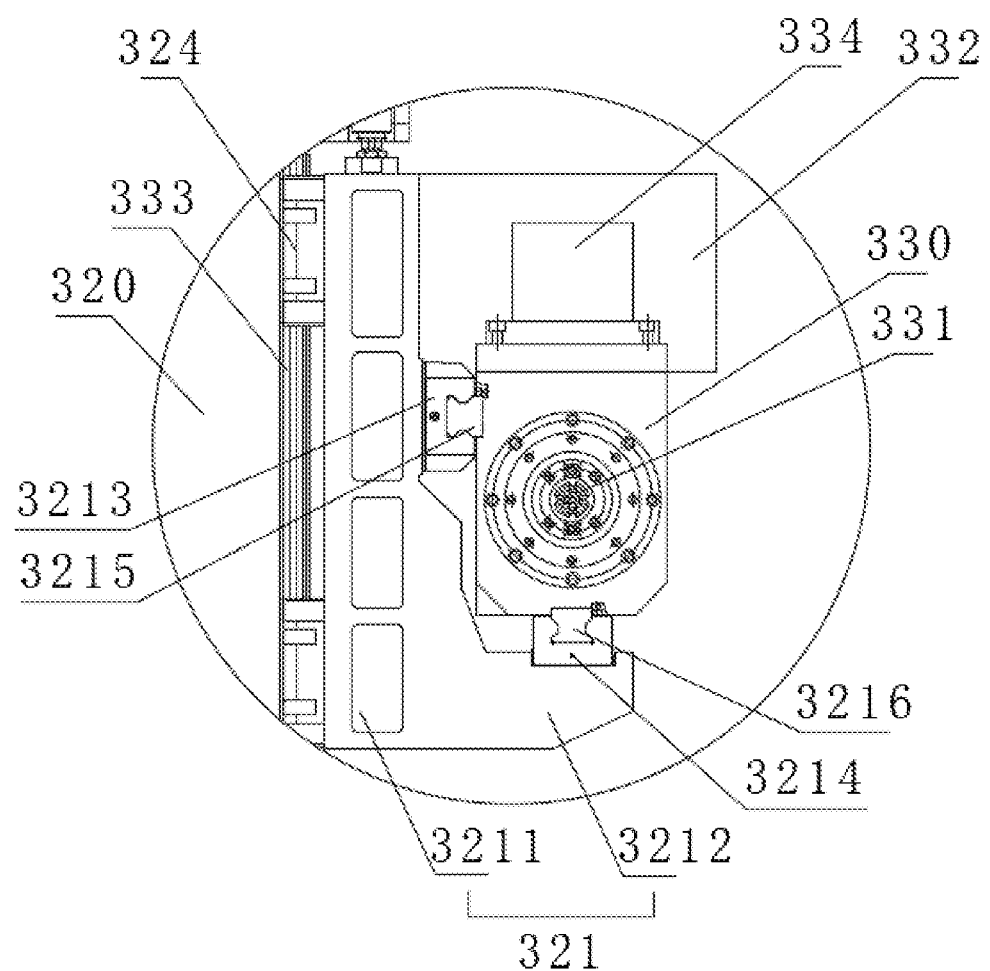
FIG. 3 is a detailed view of A shown in FIG. 2.
Figure 4:
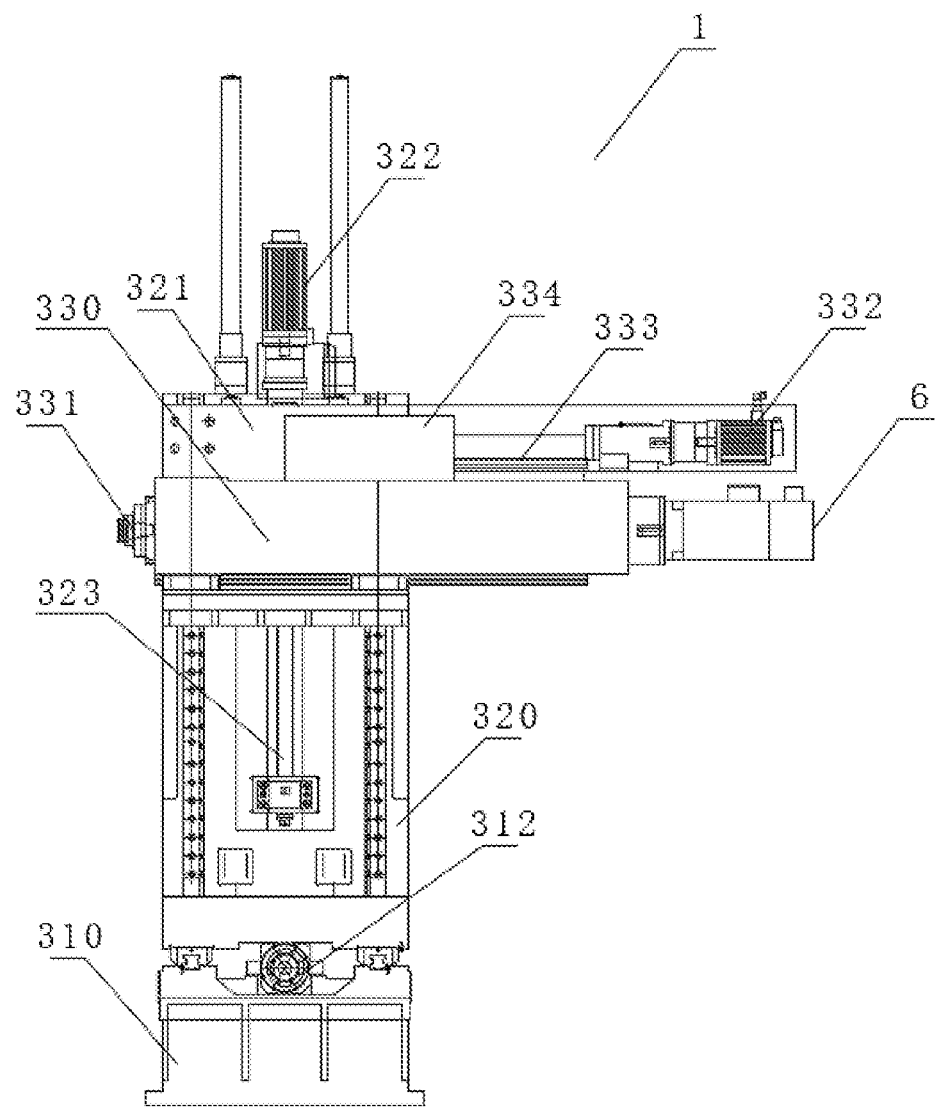
FIG. 4 is a right view of the milling spindle adjusting device of the horizontal CNC machining device for a crankshaft according to the present invention.

As shown in FIGS. 3 and 4, the Y-axis moving slide plate 321 is provided with second internal thread sleeve 324, and the second internal thread sleeve 324 is sleeved outside the second screw rod 323. The Z-axis adjusting mechanism 33 includes third servo motor 332 fixedly provided on the Y-axis moving slide plate 321. An output end of the third servo motor 332 is connected to a third screw rod 333. The Z-axis ram 330 is provided with third internal thread sleeve 334, and the third internal thread sleeve 334 is sleeved outside the third screw rod 333. The Z-axis adjusting mechanism 33 further includes fourth motor 6 provided at a side of the Z-axis ram 330 away from the milling spindle 331 and configured to drive the milling spindle 331 to rotate. Specifically, the Y-axis moving slide plate 321 has an L-shaped structure and includes vertical part 3211 and bending part 3212. The vertical part 3211 is provided with first slide groove 3213, and the Z-axis ram 330 is provided with first slider 3215 mated with the first slide groove 3213. The bending part 3212 is provided with second slide groove 3214, and the Z-axis ram 330 is provided with second slider 3216 mated with the second slide groove 3214. The Z-axis ram 330 can slide along an axial direction of the milling spindle 331 on the Y-axis moving slide plate 321, and the Y-axis moving slide plate 321 with the L-shaped structure increases the sliding stability of the Z-axis ram 330.

Figure 5:
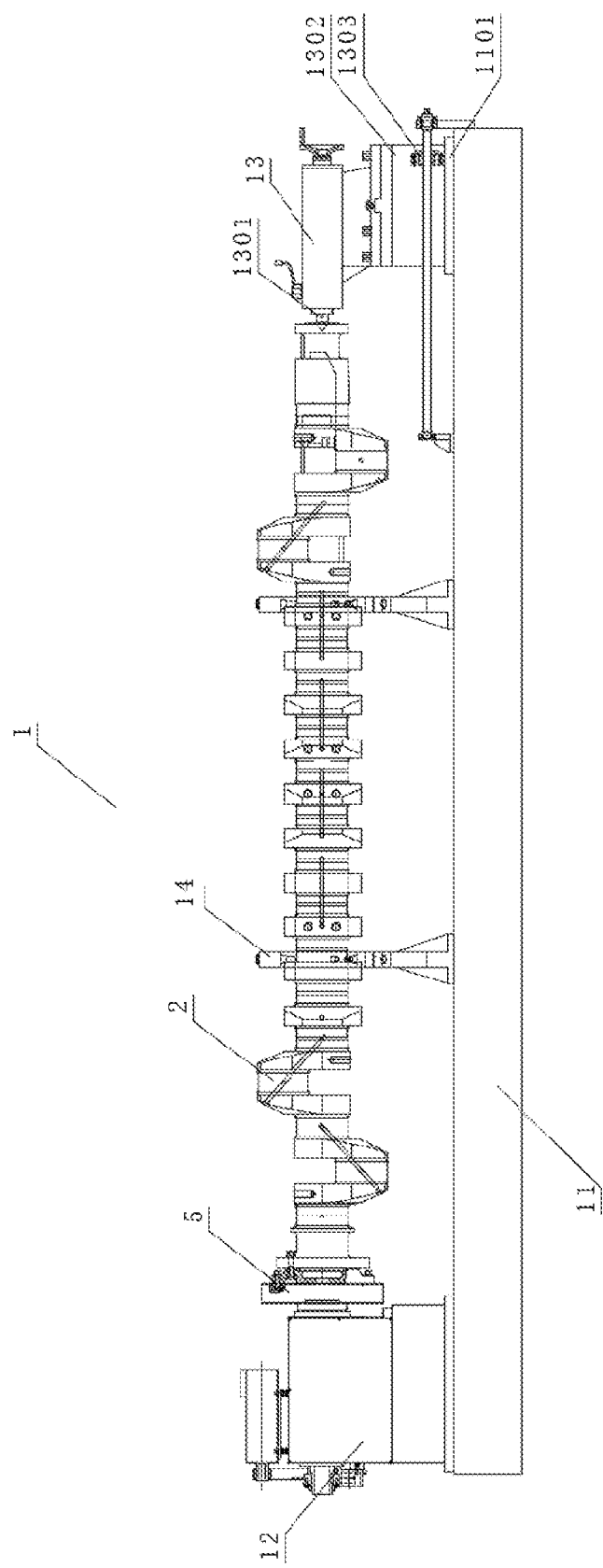
FIG. 5 is a structural diagram of a horizontal machining workbench of the horizontal CNC machining device for a crankshaft according to the present invention.

As shown in FIG. 5, the horizontal machining workbench 1 further includes tailstock 13. The tailstock 13 is symmetrical with the C-axis headstock 12 and is provided on the other side of the crankshaft 2 to define a central position of the crankshaft 2. The tailstock 13 is provided with center 1301. The center 1301 is rotatably connected to the crankshaft 2. One end of the crankshaft 2 is connected to drive shaft 4 of the C-axis headstock 12 through flange 5. Multiple keys 401 are provided at a side of the drive shaft 4 connected to the flange 5. The flange 5 is provided with a keyway mated with the keys for increasing the coupling torque of the drive shaft 4 and the flange 5. The horizontal machining workbench 1 includes workbench body 11. The workbench body 11 is provided with first slide rail 1101 at a side of the tailstock 13. The tailstock 13 is slidably connected to the first slide rail 1101 through tailstock base 1302. The tailstock base 1302 is provided with first locking element 1303 configured to fix the tailstock 13 to the first slide rail 1101. The horizontal machining workbench 1 further includes central carrier 14 provided on the workbench body 11 and configured to support a journal of the crankshaft 2. The central carrier 14 is slidably connected to the workbench body 11. The bottom of the central carrier 14 is provided with second locking element 1401 configured to fix the central carrier 14 to the workbench body 11. The tailstock 13 and the central carrier 14 reliably support and position the crankshaft 2. Through the first locking element 1303 and the second locking element 1401, the central carrier 14 and the tailstock 13 can be axially moved and fastened on the workbench body 11 according to the workpiece, which improves the versatility of the machining device.

Figure 6:
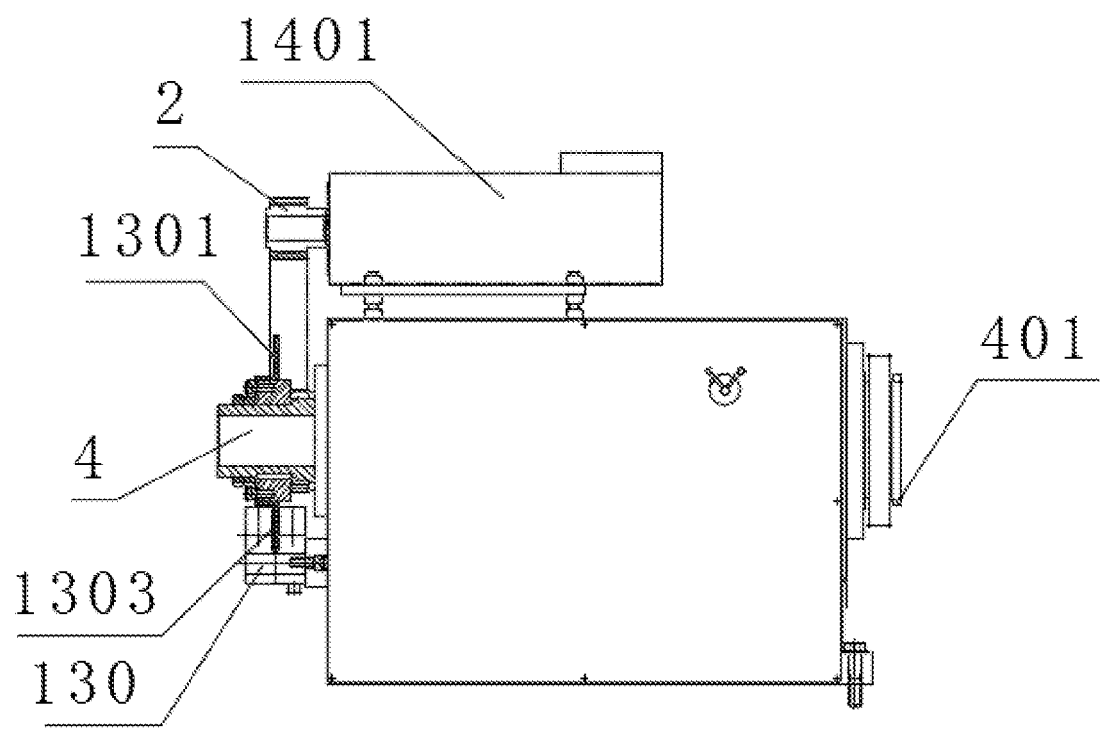
FIG. 6 is a front view of a C-axis headstock of the horizontal CNC machining device for a crankshaft according to the present invention.
Figure 7:
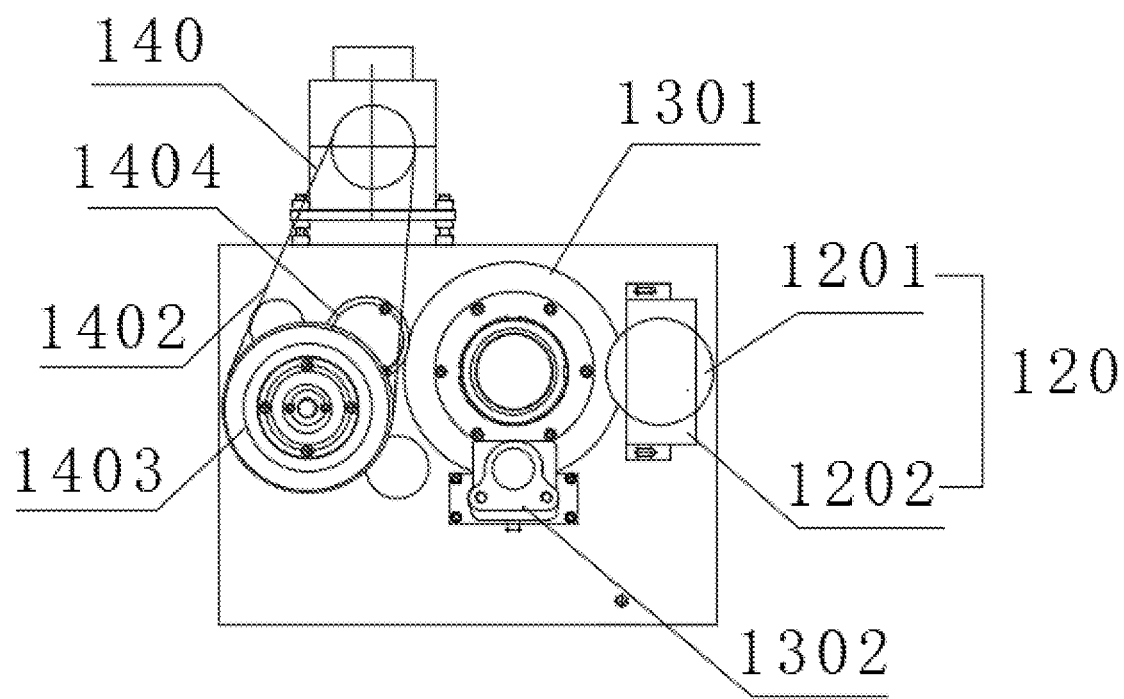
FIG. 7 is a left view of the C-axis headstock of the horizontal CNC machining device for a crankshaft according to the present invention.
Figure 8:
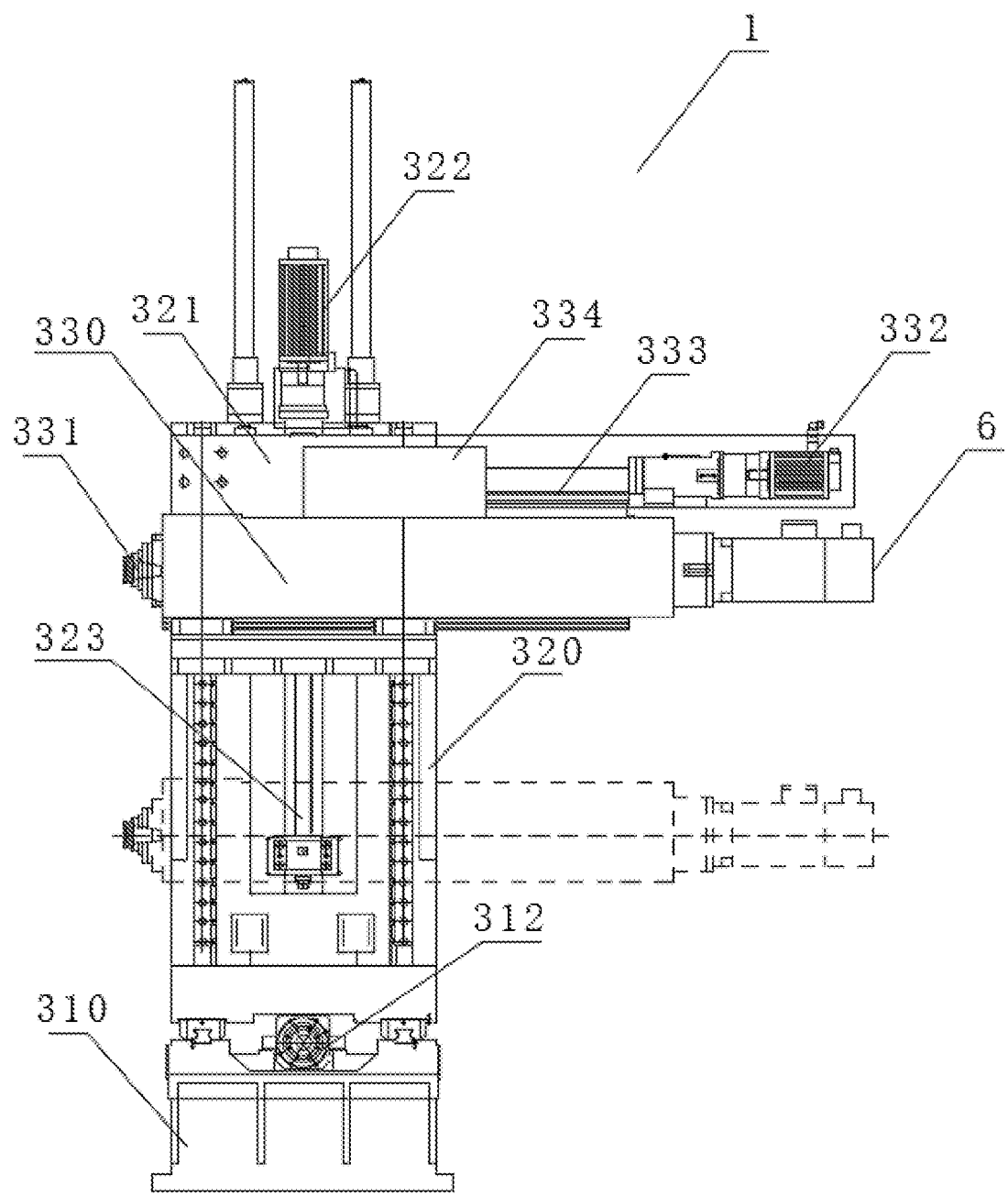
FIG. 8 is a schematic diagram of a vertically moving Z-axis ram of the horizontal CNC machining device for a crankshaft according to the present invention.

As shown in FIGS. 6 to 8, the C-axis headstock 12 further includes the drive shaft 4 connected to the crankshaft 2 and drive assembly 140 configured to control the speed of the drive shaft 4. The drive assembly 140 includes fifth servo motor 1401. The fifth servo motor 1401 is connected to headstock timing pulley 1403 through conveyor belt 1402. The headstock timing pulley 1403 is connected to the drive shaft 4 through transmission shaft 1404. The transmission shaft 1404 is connected to the transmission case. Brake assembly 130 includes brake pad 1301 fixedly provided on the drive shaft 4. The C-axis headstock 12 is provided with brake caliper 1302 mated with the brake pad 1301 to lock the brake pad 1301. The brake caliper 1302 is provided with jaw 1303 mated with the brake pad 1301 to clamp the brake pad 1301. An output end of a controller is connected to the brake caliper 1302. The controller is provided in the C-axis headstock 12. Encoder assembly 120 includes encoder 1202 connected to the drive shaft 4 through encoder timing pulley 1201. An output end of the encoder 1202 is electrically connected to the controller. The encoder 1202 can convert an angular displacement into an electrical signal. The encoder 1202 converts a rotation angle of the drive shaft 4 into a pulse count and sends the pulse count to the controller. The controller has a first preset value. When the pulse count sent to the controller by the encoder 1202 reaches a value corresponding to the first preset value, it means that the drive shaft 4 already drives the crankshaft 2 to rotate to a designated position. At this time, the controller controls the brake caliper 1302 to clamp the brake pad 1301 to lock the crankshaft 2.

The C-axis headstock 12 is provided with the drive assembly 140 to control the speed of the drive shaft 4 to perform outside diameter milling of the shaft part at different speeds, thus improving the machining accuracy. A position locking mechanism is provided to facilitate the machining of the crankshaft 2 at a specified angle. The position locking mechanism includes the encoder assembly 120 configured to control a locking angle, and the encoder assembly 120 is mated with the controller to control the locking angle. The brake assembly 130 locks the crankshaft 2 at the specified angle. After the crankshaft 2 is locked, the X, Y, and Z-axis feeding movements are realized through the milling spindle adjusting device 3. The fourth motor 6 drives the milling spindle 331 to rotate to complete machinings such as milling, drilling, boring, and tapping, which improves the applicability and machining efficiency of the machining device.

The working principle of the machining device is as follows. The tailstock 13 on the horizontal machining workbench 1 is adjusted by axial movement. The crankshaft 2 to be machined is placed on the horizontal machining workbench 1. One end of the crankshaft 2 is connected to the drive shaft 4 of the C-axis headstock 12 through the flange 5, and the other end of the crankshaft 2 is connected to the center 1301 of the tailstock 13. The central carrier 14 is adjusted by the axial movement to support the journal of the crankshaft 2, thus realizing the mounting of the crankshaft 2.

To mill the surface of crankshaft 2, the C-axis headstock 12 drives crankshaft 2 to rotate, and the X-axis adjusting mechanism 31, the Y-axis adjusting mechanism 32, and the Z-axis adjusting mechanism 33 adjust the three-dimensional position of the milling spindle 331. To perform drilling, boring, or tapping, the position locking mechanism controls the brake caliper 1302 to clamp the brake pad 1301, such that the crankshaft 2 is locked at a specified angle, and then the fourth motor 6 and the third servo motor 332 are controlled to operate.

The tailstock 13 and the central carrier 14 reliably support and position the crankshaft 2. Through the first locking element 1303 and the second locking element 1401, the central carrier 14 and the tailstock 13 can be axially moved and fastened on the workbench body 11 according to the workpiece, which improves the versatility of the machining device.

The headstock timing pulley 1403 is connected to the drive shaft 4 through the transmission shaft 1404, and the transmission shaft 1404 is connected to the transmission case. The high and low-speed gears is switched in the transmission case through a shifting lever to switch between high and low speeds to perform turning at high speed and milling at low speed. The servo motor is configured to drive to achieve fine milling of the crankshaft 2.

It is apparent to those skilled in the art that the present invention is not limited to the details of the above exemplary embodiments, and that the present invention may be implemented in other specific forms without departing from the spirit or basic features of the present invention. The embodiments should be regarded as exemplary and non-limiting in every respect, and the scope of the present invention is defined by the appended claims rather than the above description. Therefore, all changes falling within the meaning and scope of equivalent elements of the claims should be included in the present invention. Any reference numerals in the claims should not be considered as limiting the claims involved.

What is claimed is:

1. A horizontal computer numerical control (CNC) machining device, comprising:
   a crankshaft,
   a horizontal machining workbench, wherein the crankshaft is provided on the horizontal machining workbench, and
   a milling spindle adjusting device provided on a side of the horizontal machining workbench along a length direction of the crankshaft;
   wherein a milling spindle is fixedly provided on the milling spindle adjusting device, and the milling spindle adjusting device comprises an X-axis adjusting mechanism, a Y-axis adjusting mechanism, and a Z-axis adjusting mechanism, wherein the X-axis adjusting mechanism, the Y-axis adjusting mechanism, and the Z-axis adjusting mechanism are perpendicular to each other, and are configured to adjust positions of the milling spindle relative to the crankshaft along an X-axis, a Y-axis, and a Z-axis, respectively; a C-axis headstock is provided on the horizontal machining workbench and configured to drive the crankshaft to rotate; the C-axis headstock is provided with a position locking mechanism; the position locking mechanism is configured to lock a peripheral position of the crankshaft relative to the milling spindle, and the position locking mechanism comprises an encoder assembly configured to feed back a detection signal and a brake assembly configured to lock the crankshaft; and a controller is provided in the C-axis headstock and configured to control the brake assembly to perform a corresponding action according to the detection signal fed back by the encoder assembly;
   a drive assembly comprises a fifth servo motor, wherein the fifth servo motor is connected to a headstock timing pulley through a conveyor belt; the headstock timing pulley is connected to a drive shaft through a transmission shaft; the transmission shaft is connected to a transmission case; the encoder assembly comprises an encoder connected to the drive shaft through an encoder timing pulley, and the encoder has an output end electrically connected to the controller; the brake assembly comprises a brake pad fixedly provided on the drive shaft; the C-axis headstock is provided with a brake caliper mated with the brake pad; and an output end of the controller is connected to the brake caliper to control the brake caliper to lock or release the brake pad;
   the encoder is configured to convert a rotation angle of the drive shaft into a pulse count and send the pulse count to the controller; the controller has a first preset value; when the pulse count sent to the controller by the encoder reaches a value corresponding to the first preset value, the pulse count means that the drive shaft already drives the crankshaft to rotate to a designated position; and at this time, the controller controls the brake caliper to clamp the brake pad to lock the crankshaft;
   the horizontal machining workbench further comprises a central carrier, wherein the central carrier is provided on a workbench body and configured to support a journal of the crankshaft;
   the horizontal machining workbench further comprises a tailstock; the horizontal machining workbench comprises the workbench body; wherein a first slide rail at a side of the tailstock is provided on the workbench body; the tailstock is slidably connected to the first slide rail through a tailstock base; a first locking element is provided on the tailstock base and configured to fix the tailstock to the first slide rail; the central carrier is slidably connected to the workbench body; and a bottom of the central carrier is provided with a second locking element configured to fix the central carrier to the workbench body; and
   the tailstock and the central carrier are configured to reliably support and position the crankshaft.

2. The horizontal CNC machining device according to claim 1, wherein the X-axis adjusting mechanism comprises an X-axis moving base provided along the length direction of the crankshaft; the Y-axis adjusting mechanism comprises a first pillar slidably connected to the X-axis moving base, and a Y-axis moving slide plate is slidably connected to the first pillar; the Z-axis adjusting mechanism comprises a Z-axis ram slidably connected to the Y-axis moving slide plate; and the milling spindle is provided on the Z-axis ram.

3. The horizontal CNC machining device according to claim 2, wherein the X-axis adjusting mechanism comprises a first servo motor provided on a side of the X-axis moving base; a first screw rod is provided on the X-axis moving base, and the first screw rod is connected to an output end of the first servo motor; a bottom of the first pillar is provided with a first internal thread sleeve mated with the first screw rod; the first internal thread sleeve is sleeved outside the first screw rod; the Y-axis adjusting mechanism comprises a second servo motor provided on a top of the first pillar, and the second servo motor has an output end connected to a second screw rod; the Y-axis moving slide plate is provided with a second internal thread sleeve, and the second internal thread sleeve is sleeved outside the second screw rod; the Z-axis adjusting mechanism comprises a third servo motor fixedly provided on the Y-axis moving slide plate, and the third servo motor has an output end connected to a third screw rod; the Z-axis ram is provided with a third internal thread sleeve, and the third internal thread sleeve is sleeved outside the third screw rod; and the Z-axis adjusting mechanism further comprises a fourth motor provided at a side of the Z-axis ram, wherein the side of the Z-axis ram is away from the milling spindle.

4. The horizontal CNC machining device according to claim 1, wherein the tailstock is provided at a side of the crankshaft to define a central position of the crankshaft, wherein the side of the crankshaft is away from the C-axis headstock; and the tailstock is provided with a center rotatably connected to the crankshaft.

5. The horizontal CNC machining device according to claim 1, wherein the C-axis headstock further comprises the drive shaft connected to the crankshaft and the drive assembly configured to control a speed of the drive shaft.

* * * * *